United States Patent
Sreejith et al.

(10) Patent No.: US 8,553,539 B2
(45) Date of Patent: Oct. 8, 2013

(54) METHOD AND SYSTEM FOR PACKET TRAFFIC CONGESTION MANAGEMENT

(75) Inventors: Sreedharan Sreejith, Santa Clara, CA (US); Praseeth Sreedharan, Santa Clara, CA (US)

(73) Assignee: Samsung Electronics Co., Ltd., Suwon-Si (KR)

(*) Notice: Subject to any disclaimer, the term of this patent is extended or adjusted under 35 U.S.C. 154(b) by 709 days.

(21) Appl. No.: 11/770,565

(22) Filed: Jun. 28, 2007

(65) Prior Publication Data

US 2009/0003354 A1  Jan. 1, 2009

(51) Int. Cl.
*H04J 1/16* (2006.01)

(52) U.S. Cl.
USPC ...................................... 370/230; 370/395.31

(58) Field of Classification Search
USPC .............. 370/229, 230, 230.1, 231, 235, 236, 370/236.1
See application file for complete search history.

(56) References Cited

U.S. PATENT DOCUMENTS

| | | | |
|---|---|---|---|
| 6,697,863 B1* | 2/2004 | Egawa et al. | 709/226 |
| 6,865,179 B1* | 3/2005 | Cao | 370/352 |
| 2003/0041146 A1* | 2/2003 | Davis et al. | 709/227 |
| 2004/0013111 A1* | 1/2004 | Faccin | 370/378 |
| 2004/0083289 A1* | 4/2004 | Karger et al. | 709/226 |
| 2005/0074017 A1* | 4/2005 | Qian et al. | 370/401 |
| 2005/0141427 A1* | 6/2005 | Bartky | 370/235 |
| 2006/0077963 A1* | 4/2006 | Li et al. | 370/352 |
| 2006/0274650 A1* | 12/2006 | Tyagi et al. | 370/229 |
| 2007/0147344 A1* | 6/2007 | Sundqvist et al. | 370/352 |
| 2008/0232248 A1* | 9/2008 | Barave et al. | 370/230 |

* cited by examiner

*Primary Examiner* — Obaidul Huq (57) ABSTRACT

A packet routing system is provided that comprises a processor, a component, a resource map and a resource map manger. The component classifies an incoming packet of a user session. The resource map identifies a plurality of resources used to process the incoming packet. The resource map manager determines an availability of at least some of the resources and based on the availability either promote processing the incoming packet or drop the incoming packet.

21 Claims, 4 Drawing Sheets

METHOD AND SYSTEM FOR PACKET TRAFFIC CONGESTION MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A packet routing system is part of a packet network that is responsible for routing packets from one node to the next. A process at a packet routing system is a functional module that is responsible for performing one or more designated functions on an incoming packet.

Each of the above mentioned processes at a packet routing system may use one or more resources to process the incoming packet. A process may use multiple resources and multiple processes may share the same resource.

A packet routing system may process a plurality of user sessions at the same time. When the number of the simultaneous sessions crosses a threshold, multiple sessions may compete for the same resource and a resource contention situation may occur.

SUMMARY

In one embodiment, a packet routing system is provided that comprises a processor, a component, a resource map and a resource map manger. The component classifies an incoming packet of a user session. The resource map identifies a plurality of resources used to process the incoming packet. The resource map manager determines an availability of at least some of the resources and based on the availability either promote processing the incoming packet or drop the incoming packet.

In one embodiment, a method for congestion management for a packet routing system is provided. The method comprise classifying an incoming packet of a user session, determining a plurality of resources used to process the incoming packet, creating a resource map identifying resources used to process the incoming packet, determining an availability of at least some of the plurality of the resources. The method includes deciding whether to drop the incoming packet based on the unavailability or congestion of one or more of the resources.

In still another embodiment, a packet routing system for resource congestion avoidance is provided. The packet routing system comprises a packet session state table, a plurality of resources, a plurality of processes, a resource map and a resource map manager. The packet session state table includes state information of a plurality in-progress user sessions at the packet routing system. At least one of the plurality of processes uses at least one of the resources to process an incoming packet. The resource map is associated with each of the user sessions in the packet session state table and contains a set of resources required for processing the incoming packet of the user session. The resource map manager is configured to determine an availability of each resource in the resource map and determine whether to drop the incoming packet based on the availability of the resource.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure allow a packet routing system such as an IP router to make a decision upon receiving an incoming packet on whether to allow the packet through the IP router based on the congestion status of the internal resources required to process the packet. Typically as an incoming packet arrives at a packet routing system, the packet is processed regardless of checking the availability of the resources required to process the packet. Consequently a packet may be dropped at any point through the processing if one of the required resources is congested, especially under a heavy traffic condition at the packet routing system. To address this issue, the present disclosure presents a packet routing system with a resource map that is created for each new IP session upon receiving the first packet of the new session. The resource map includes a list of the resources required for processing packets of the session and a congestion status indicator for each resource in the resource map. The present disclosure also provides a resource map manager that decides whether or not to drop a packet of the session before any processing of the packet takes place based on the congestion status of the resources as indicated by the resource map.

An IP router is one of the most common packet routing systems and thus the term packet routing system and the term IP router may be used interchangeably in the present disclosure. A packet routing system is responsible for receiving a packet at an ingress port, processing it, and then routing it to the next hop router via an egress port. As commonly classified in the art, a packet routing system may be of one of the two general categories: state-aware or state-full and stateless. A stateless packet routing system receives a packet, processes and route it out, independent of any previous packets of the same session or those packets to follow. Two packets of the same session may travel two different routes to reach the same destination. On the other hand, a state-aware or state-full IP packet routing system processes all packets of the same session the same way because each of the packets is recognized as belonging to the same session through mechanisms such as a unique session ID. Also the packets of the same session travel the same path in an IP network to reach the destination. The state-full packet routing system is becoming increasingly common in order to support the applications that requires some sort of agreed level of quality of service (QoS). These applications may include VoIP, multi-media/video conferencing and mission-critical bank transactions. The technologies that may help achieve improved QoS on a packet routing system include, but are not limited to, MPLS (Multiple Protocol Label Switch), IP QoS DiffServ, ATM virtual path and virtual channel, and frame relay. The present disclosure is directed to the state-full routing system.

Figure 1:
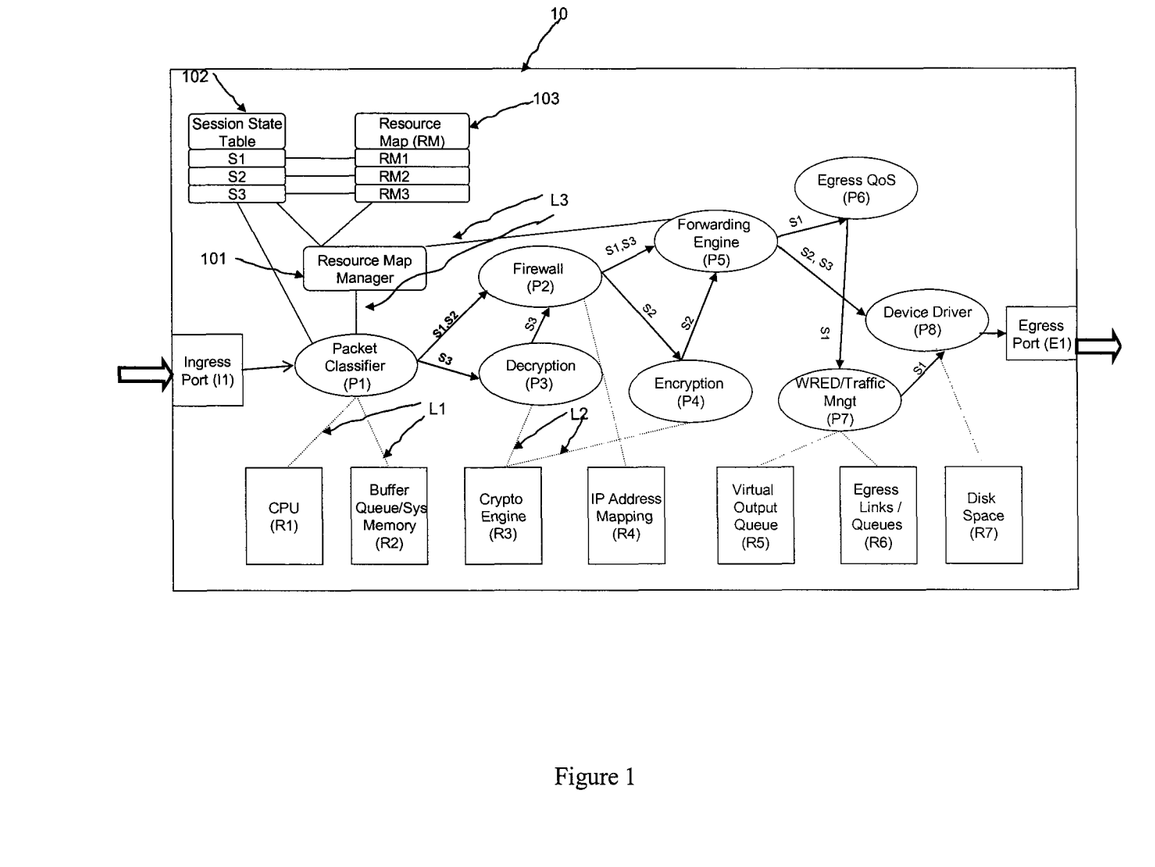
FIG. 1 illustrates a diagram of a packet routing system according to one embodiment of the present disclosure.

FIG. 1 shows a partial view of a packet routing system 10 that comprises an ingress (incoming) ports 11, an egress port E1, a set of internal resources R1, R2, R3, R4, R5, R6, and R7, and a set of processes P1, P2, P3, P4, P5, P6, P7, and P8. A subset of the processes is responsible for processing an incoming packet, using one or more of the resources.

FIG. 1 also shows three user sessions S1, S2, S3. A packet session refers to a stream or flow of continuous packets that are associated with one instance of a user application connecting two hosts or network nodes. Other terms also used to refer to a session include a packet flow, a packet stream, and a path. In the context of this disclosure, these terms are used interchangeably unless otherwise explained.

The ingress port 11 and egress port E1 are physical resources on the packet routing system responsible for receiving and sending out incoming packets via transmission wires that physically connect the packet routing system to outside packet networks. A number of ports can be aggregated onto a card that is commonly known as a network interface card (NIC).

A process at a packet routing system is a function module, responsible for performing one or more designated functions on an incoming packet. As the incoming packet arrives at the ingress port 11, the packet may first encounter the process packet classifier P1. The packet classifier P1 is responsible for classifying the user session into a predefined class based on a variety of information that may include a service type information embedded in the packet header and a service level agreement (SLA) with a specific customer. For example, the TOS (Type of Service) field of the IP packet header may be used by some applications to indicate the type of traffic carried in the IP packets.

Another process commonly found at a packet routing system is a firewall P2. A firewall is responsible for shielding the topology of a network from the outside world by providing one or a set of public visible IP addresses to the outside while hiding the internal IP address from the outside. One of its functions is to translate a publically visible IP address into an internal, non-public IP address of an internal node on the network and vice versa. By hiding the internal IP addresses from the outside, the firewall protects the network from unauthorized direct access to the internal resource and network nodes and thus reduces the chance of a network security breach.

Two other processes are the encryption P4 and the decryption P3. Process P3 and P4 are commonly seen on a packet routing system to support applications that have stringent security requirements and require encryption of outgoing packets and decryption of incoming packets. Examples of those applications include bank transactions and remote VPN telecommuting applications.

Various traffic control and QoS related processes may also be found on the packet routing system. The egress QoS process P6 may enforce a QoS policy on egress traffic to meet a prior agreed SLA with a customer by ensuring the bandwidth, throughput and other specified traffic parameters are met. Traffic management tools such as RED (Random Early Detection) or its variant WRED (Weighted Random Early Detection) P7 may also be found at the packet routing system to detect a network traffic congestion condition that may be caused by an event like network link breakdown, or heavy concentration of traffic on certain links, and then decide on an action that could be taken at this packet routing system.

The process packet forward engine P5 is responsible for determining which egress port and which next hop router to route the packet to. It may use the information from a routing table, a session state table, a destination IP address as specified in the packet header, and one of the standard IP routing algorithms. The standard IP routing algorithms may include OSPF (open shortest path first), IS-IS (intermediate system-intermediate system) and their variants. One other example process is a device driver P8 that is responsible for operating I/O or other devices on the packet routing system.

A set of resources in the packet routing system 10 provides the resources needed for a process to perform its functions. A process on the packet routing system 10 may require one or more resources to perform its designated functions. For example, the process packet classifier P1 needs the resource CPU R1 and the resource buffer queue R2, as indicated by the line L1. A resource may be dedicated to a single process. For example, the resource virtual output queue R5 and the resource egress links R6 may be exclusively used by the process WRED/traffic management P7. A resource may be shared by more than one process. For example, the resource crypto engine R3 is used by both the decryption module P3 and encryption module P4, as indicated by the line L2. The examples of the resource that may be found on the packet routing system 10 include CPU R1, system memory R2, crypto engine R3, IP address mappings R4, virtual output queue R5, egress links R6 and disk space R7.

The above mentioned processes and resources are exemplary of the processes and resources that may be found on the packet routing system 10. However, the present disclosure does not require all of nor is limited to the disclosed processes and resources.

One common approach to resource congestion handling at a packet routing system can be characterized as check-as-you-go. In this approach, packet processing proceeds from one process to the next, checking for any congestion condition at each resource as the resource is needed. An issue associated with this approach is the potential waste of resources and processing time, as illustrated in the following scenario. The processing of an incoming packet proceeds to the last step when it is found out that a needed resource is not available and the packet has to be dropped. In addition, this approach may result in a traffic pattern that is less predictable and thus harder to control, because of the randomness of the resource availability.

The issue associated with the common approach to resource congestion handling at the packet routing system can be illustrated via an example. For example, a packet of the session S3 goes through the process packet classifier P1, the decryption module P3, the firewall P2, and the packet forward engine P5, and finally reaches the process disk driver P8, only to find out that the resource required by the process P8, the disk space (R7), is not available and the packet has to be dropped. The system resources could have been used to successfully process packets of other sessions such as S1 and S2.

The present disclosure addresses the issue associated with the common approach to handling resource congestion by looking ahead at the congestion status of the resources required for the session and making a decision of whether or not to proceed before processing the packet.

The present disclosure provides a resource map 103 and a resource map manager 101 among other components. The resource map 103 is created when a session is established and a session entry is created in a session state table 102. As the first packet of a new user session arrives at the packet routing system 10, the packet routing system 10 may provide a unique session ID with the combination of 5 tuples (source IP address, source port, destination IP address, destination port and upper layer protocol) from the packet header. The packet routing system 10 then searches for this unique session ID in the session state table 102. It should be appreciated that other way of identifying the packets or associating unique identify might be used. The failure to find a match in the session state table 102 indicates that this is a new session and a new entry in the session state table 102 with the new session ID as the index field is created. Once the new entry is created for the new session in the session table, a corresponding resource map RM1 is created in the resource map table 103. Three sample sessions, S1, S2 and S3 are shown in the session state table with three corresponding resource maps RM1, RM2 and RM3.

The resource map RM1 contains a list of the resources required for the user session S1. When the new session S1 is established, the traffic type the session belongs to, a process path consisting of the processes each packet of the session goes through at the packet routing system, and the resources required for processing each packet are determined. For example, if the session S1 is for a VoIP application, the mechanism such as the ToS field in the packet header or a standard signaling message such as a session initiation protocol (SIP) INVITE message may provide sufficient information for the packet classifier P1 to decide the type of traffic for this session. The process path for the session S1 is determined to consist of the process packet classifier P1, the firewall P2, the forwarding engine P5, the egress QoS P6, the WRED/traffic management P7 and the device driver P8. The process path may be determined based on certain criteria that may include, but are not limited to, a service level agreement, the type of traffic, and one or more user specific requirements. Once the process path is determined, so is a list of resources required by the processes. For example, the resources required by the session S1 include the CPU R1, the buffer queue R2, the IP addressing mappings R4, and the disk space R7. Once the resources are decided for the session, the resource map RM1 in the resource map table 103 is created. The order in which the resources are used, R1, R2, R4 and R7 may be reflected in the list of the resource map for operational efficiency. In another embodiment, the resource list may be implemented as a bit map or a linked list in the resource map.

There may be different embodiments or techniques for maintaining or obtaining congestion status information for each resource. In one embodiment, the most up-to-date congestion status information is kept at the resource map with a binary-valued congestion status indicator. The indicator may default to "not congested" and is set to "congested" when the resource reports a congestion situation. In another embodiment, the most up-to-date congestion status information is kept at each resource. The resource map 103 may have a resource ID and a pointer to an API or a register at the resource. The resource map manager 101 queries for the congestion status on demand by calling the API or reading the register in the corresponding hardware resource to get the congestion status directly from the resource.

The resource map manager 101 is configured to create, query and destroy a resource map 103 and to make a decision on whether to drop an incoming packet based on the resource congestion status. The resource map manager 101 may create a resource map 103 at the time when a new session is established and clean up the resource map 103 when the corresponding session is torn down. During the processing of the packet, the resource map manager 101 may query for the congestion status of each resource in the resource map 103 and make a decision on whether to drop the packet based on the resource congestion status.

The resource map manager 101 is also responsible for interacting with other processes such as the packet classifier P1 and the packet forwarding engine P5 to perform required processing when a session is created or after a packet is dropped. For example, when a packet is dropped, an error type indicator may be sent to a remote sending party, depending on the routing protocol in use. The interactions between the resource map manager 101 and the two processes P1 and P5, as indicated by the line L3, are exemplary and there might be other types of interactions between the resource map manager 101 and the other processes.

Figure 2:
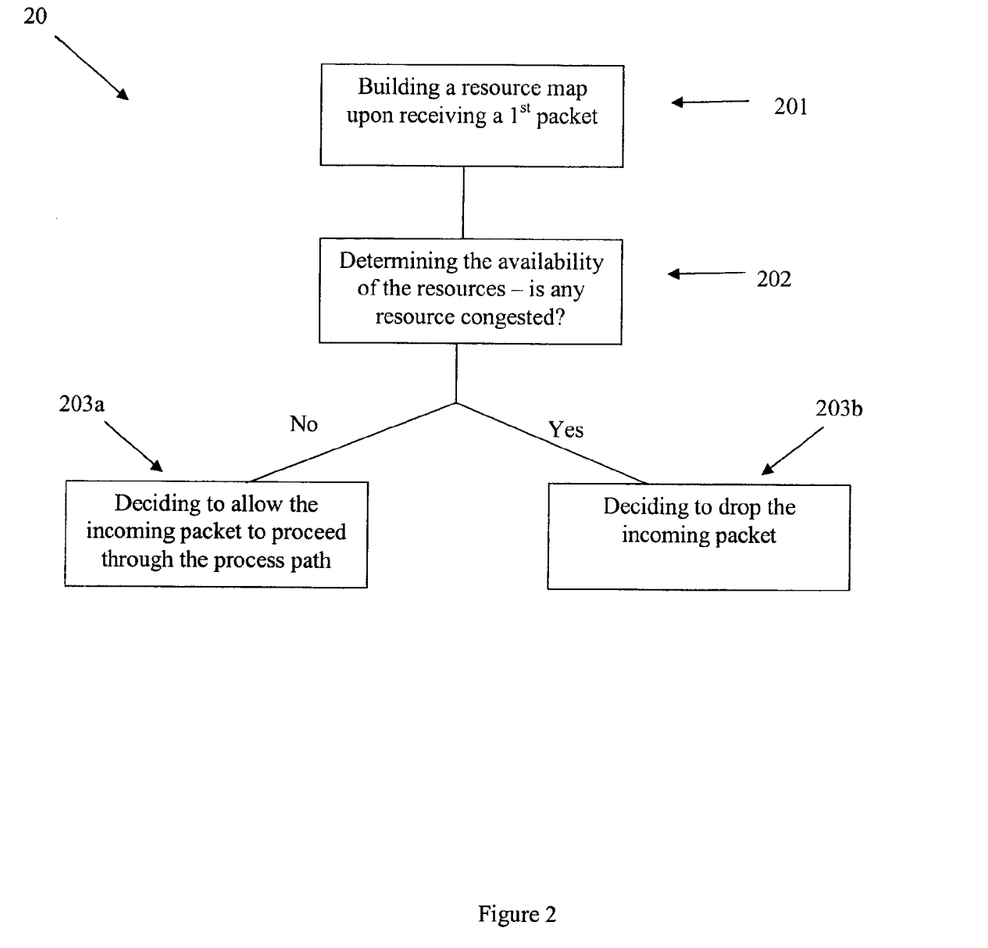
FIG. 2 illustrates a flow diagram of a congestion avoidance method according to one embodiment of the present disclosure.

FIG. 2 illustrates the method 20 for congestion management at a packet routing system. As shown by the block 201, a resource map is created when a packet of a new session is identified at the packet routing system. As the first packet of a user session arrives at the packet routing system, the failure to find a match for the unique combination of 5 tuples (source IP address, source port, destination IP address, destination port and upper layer protocol) of the packet indicates that this is a new session and a new entry in the session state table is created, as part of the initial packet processing. The resource map manager then creates a resource map for the session in the resource map table. The resource map comprises a list of resources required for the session according to the type of traffic and the sequence of the resource usages in the system.

The block 201 illustrates that part of building a resource map may involves determining a set of resources needed to process each packet of the associated session. When the associated session is established, the traffic type, the process path of the session, and the resources required for the session are determined.

At block 202, upon the arrival of an incoming packet, the resource map manager retrieves the resource map associated with the session of the incoming packet and determines the availability of each resource in the resource map. Determining the resource availability involves checking the congestion status of each resource in the retrieved resource map. In one embodiment, checking the congestion status of the resources involves traversing the resource list and checking the congestion status indicator of each resource. In another embodiment, checking the congestion status of the resources involves calling an API at the resource to get the current congestion status directly from the resource itself.

In box 203a and 203b, a decision is made on whether to allow the incoming packet through the process path and proceed to an egress port or drop the incoming packet due to resource congestion. In one embodiment, the packet is dropped as soon as one congested status is found. In another embodiment, the resources may be prioritized into critical and non-critical categories and a packet is dropped only if a congestion condition is indicated for a critical resource.

Criteria for resource congestion may vary from one resource to the next. For example, a congestion condition for the CPU resource may be indicated by whether or not it is overloaded and a percentage threshold may be used for gauging whether a CPU is congested. For system memory resource, a percentage usage threshold may be appropriate. For an encryption and decryption engine, the congestion condition may be indicated by a CPU usage and its input queue length. For the resource virtual output queue, thresholds for packet loss rate, throughput, delay, delay variant may be used to measure whether or not the resource is congested.

Figure 3:
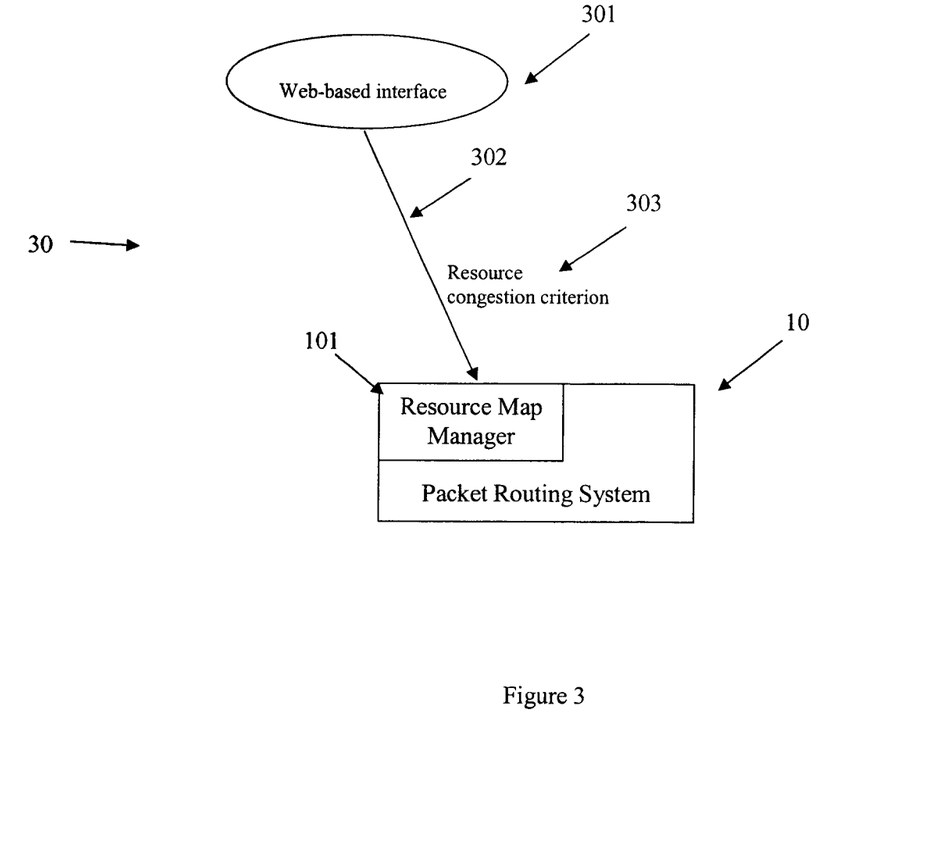
FIG. 3 illustrates a block diagram of a system for allowing a user to provision congestion criteria into a packet routing system.

FIG. 3 illustrates a packet routing system with a web-based provisioning system 30 that allows a user to provision criteria for a congested condition for a resource. It may be desirable to have a user-definable "congestion" criterion rather than hard coded ones, to accommodate diverse types of traffic conditions and allow flexibility. For example, a CPU can be defined as "congested" when it reaches 80% of CPU busy for normal traffic conditions. But in case of critical traffic with guaranteed throughput and other stringent QoS requirements for a specified period of time, it may be desirable to define the criteria for being "congested" as 65% of CPU busy.

The packet routing system with a congestion criteria provisioning capability 30 as shown in FIG. 3 may have a web-based interface 301 to allow a user to input a user defined congestion criterion. The criterion 303 may then be sent to the resource map manager 101 at the packet routing system 10 via an IP network connection 302. The resource manager 101 in turn stores the criteria and updates the "congested" status indicator for the associated resource from this point on using the newly provisioned congestion criteria.

Figure 4:
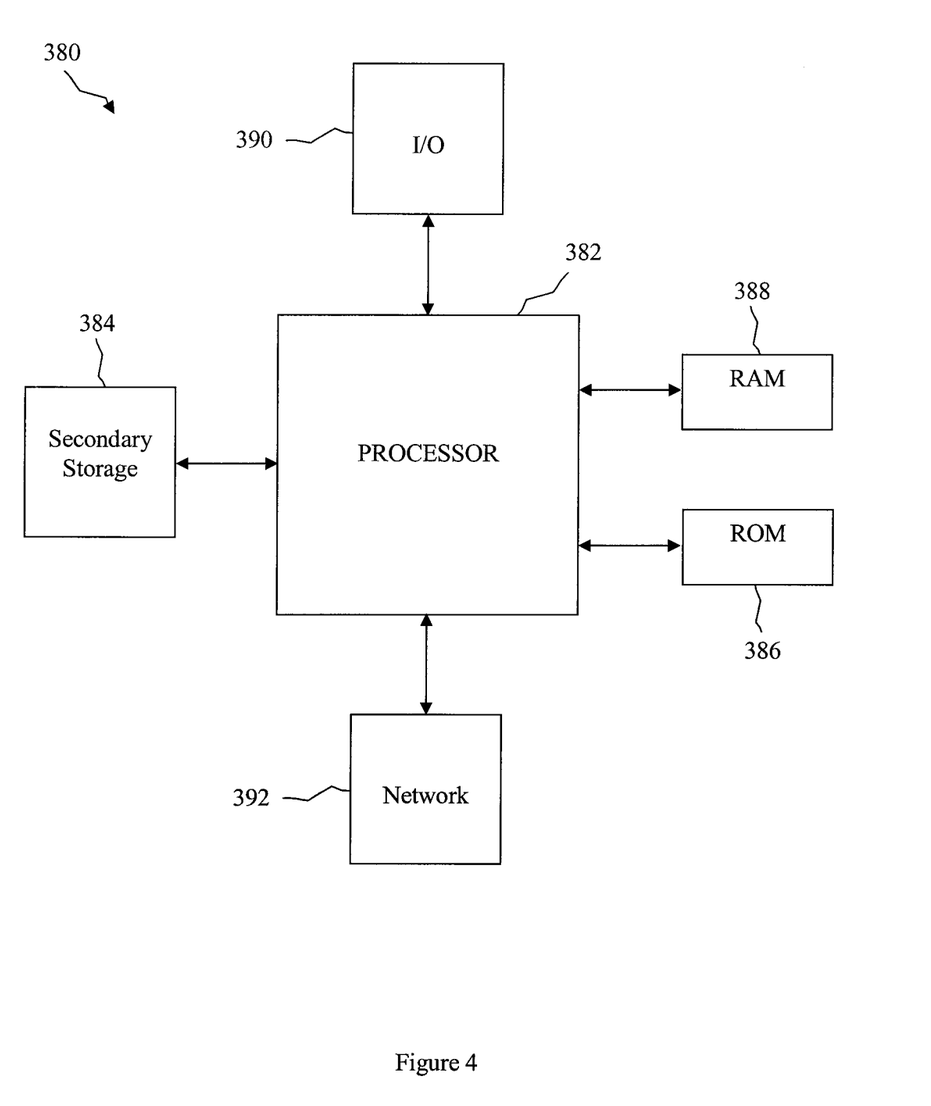
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein, such as a router or other such systems. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A packet routing system, comprising: a processor;
   a component configured to classify an incoming packet of a user session at an ingress port of the packet routing system;
   a resource map stored in a memory and configured to identify a plurality of resources in the packet routing system that are required to process the incoming packet from the ingress port to an egress port of the packet routing system, the resource map corresponding to the user session, wherein the resources are internal to the packet routing system and include at least one of the processor, a memory, virtual buffers, and an encryption engine; and a resource map manager configured to create the resource map when the incoming packet corresponds to a new user session, to determine an availability for each of the resources of the resource map for processing the incoming packet before any processing is performed on the incoming packet, and to drop the incoming packet when at least one of the plurality of resources is unavailable, wherein the resource map manager is configured to allow the incoming packet through a process path comprising processes that utilize a set of resources required for processing the incoming packet if none of the resources from the resource map indicates a congested status.

2. The system as in claim 1, wherein the resource manager is configured to:

create the resource map as the user session is created,
modify the resource map as the user session is modified, and
delete the resource map as the user session is torn down.

3. The system of claim 1, wherein the availability of each resource is determined based on a user-definable congestion criterion.

4. The system of claim 1, wherein the resource map manager is configured to drop the incoming packet before any processing of the incoming packet takes place if one of the resources from the resource map indicates a congested status.

5. The system of claim 1, further comprising a plurality of ingress ports configured to receive the incoming packet.

6. The system of claim 1, further comprising a plurality of egress ports configured to send the incoming packet to a next hop router on a packet network.

7. The system of claim 1, wherein the packet routing system is a component of one of a group consisting of an enterprise IP router and a wide area network IP router.

8. The system of claim 1, wherein the processes that utilize the set of resources are internal to the packet routing system and include one or more of a packet classifier, a firewall, a packet encryption module, a packet decryption module, a device driver, a packet buffer, and a packet forwarding engine.

9. The system of claim 1, wherein the resource map comprises a linked list of the resources and an order of the resources on the linked list is based on an order in which the resources are used.

10. The system of claim 1, wherein the packet routing system is configured to process packets of IPv4 or IPv6 packet format.

11. A packet routing system for resource congestion avoidance, comprising:

a packet session state table including state information of a plurality of in-progress user sessions at the packet routing system;
a plurality of resources configured to process data, the plurality of resources comprising a processor and a buffer memory;
a memory configured to store a resource map associated with one of the user sessions in the packet session state table, the resource map configured to identify a set of resources from the plurality of resources required for processing an incoming packet of the user session from an ingress port to an egress port of the packet routing system; and a resource map manager configured to create the resource map when the incoming packet corresponds to a new user session, to determine an availability of each resource in the resource map for processing the incoming packet before any processing is performed on the incoming packet, and to drop the incoming packet based on the availability of the resource, wherein the resource map manager is configured to allow the incoming packet through a process path comprising processes that utilize the set of resources required for processing the incoming packet if none of the resources from the resource map indicates a congested status.

12. The system of claim 11, wherein the resource map manager determines the availability of the resources by checking a binary-valued congestion status indicator associated with the resource in the resource map.

13. The system of claim 11, wherein the packet routing system is a component of one of a group consisting of an enterprise IP router and a wide area network IP router.

14. The system of claim 11, wherein the packet routing system is configured to process packets of IPv4 or IPv6 packet format.

15. A method for congestion management for a packet routing system including a processor and a memory, comprising:

classifying an incoming packet of a user session that is received at an ingress port of the packet routing system;
creating a resource map identifying a plurality of resources in the packet routing system that are required to process the incoming packet from the ingress port to an egress port of the packet routing system when the incoming packet corresponds to a new user session, the resource map being stored in the memory, wherein the resources are internal to the packet routing system and include at least one of the processor, the memory, virtual buffers, and an encryption engine;
determining by a resource map manager an availability for each of the resources identified in the resource map for processing the incoming packet before any processing is performed on the incoming packet; and
deciding whether to drop the incoming packet based on the availability of at least one of the plurality of resources,
wherein the resource map manager is configured to allow the incoming packet through a process path comprising processes that utilize a set of resources required for processing the incoming packet if none of the resources from the resource map indicates a congested status.

16. The method of claim 15, wherein the availability of each resource is determined based on a user-definable congestion criterion.

17. The method of claim 15, wherein deciding whether to drop the incoming packet further comprises deciding to drop the incoming packet if the resource map indicates a congested status for one of the resources in the resource map.

18. The method of claim 15, further comprising post packet-dropping processing that includes generating an error type code to be sent to a sending party of the incoming packet.

19. The method of claim 15, wherein determining the availability of the resources in the resource map further comprises checking a binary-valued congestion status indicator associated with the resource in the resource map.

20. The method of claim 15, wherein determining the availability of the resources in the resource map further comprises calling an API associated with the resource to retrieve a congestion status from the resource.

21. The method of claim 15, further comprising:
sending the incoming packet to a next hop router on a packet network via one of a plurality of egress ports.

* * * * *